No. 800,561. PATENTED SEPT. 26, 1905.
W. T. FEILD.
LAP RING.
APPLICATION FILED NOV. 26, 1904.
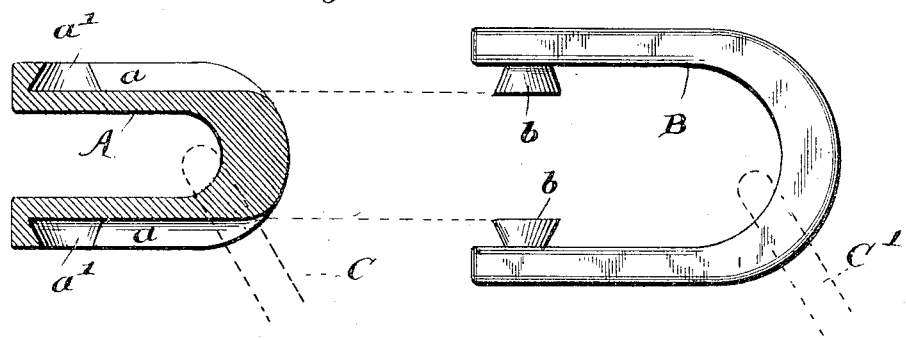
Fig. 1.
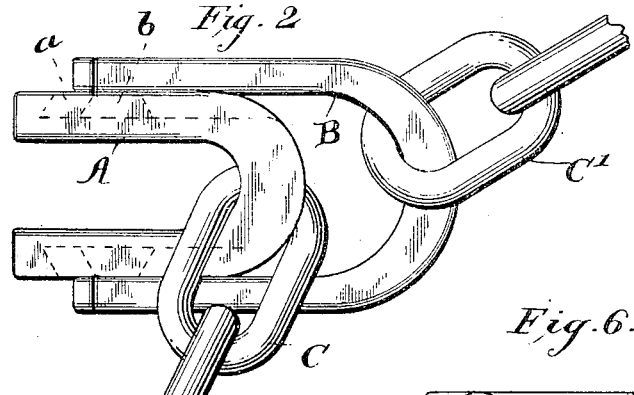
Fig. 2.
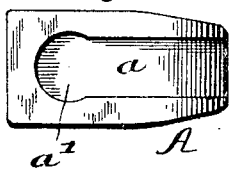
Fig. 5.
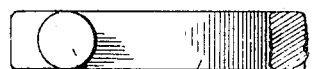
Fig. 6.
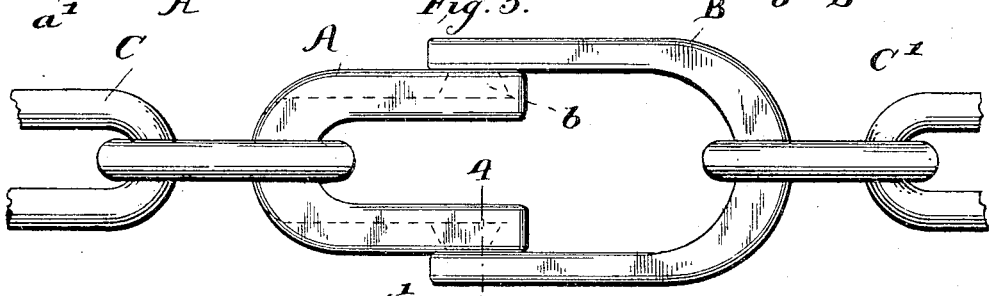
Fig. 3.
Fig. 4.
WITNESSES:
W. S. Rockwell
Edw. W. Byrn.
INVENTOR
Wilber T. Feild.
BY Munn & Co.
ATTORNEYS

UNITED STATES PATENT OFFICE.

WILBER T. FEILD, OF BOND, TENNESSEE.

LAP-RING.

No. 800,561.     Specification of Letters Patent.     Patented Sept. 26, 1905.

Application filed November 26, 1904. Serial No. 234,428.

*To all whom it may concern:*

Be it known that I, WILBER T. FEILD, a citizen of the United States, residing at Bond, in the county of Shelby and State of Tennessee, have invented a new and useful Improvement in Lap-Rings, of which the following is a specification.

My invention is in the nature of a new lap-ring designed to couple up a swingletree to any draft attachment or to connect two sections of chain or for any analogous purpose; and it consists in a lap-ring composed of two separate U-shaped sections, one part being provided with longitudinal grooves and the other part with inwardly-facing locking-lugs adapted to enter the grooves of the first-named section and be locked thereto by a half-turn, as hereinafter fully described with reference to the drawings, in which—

Figure 1 is a side view of the two parts of the lap-ring detached from each other, the left-hand part being shown in longitudinal section. Fig. 2 is a side view of the two parts of the ring having the chain ends or other parts to be connected hooked into the lap-ring sections and the lap-ring sections connected by the first movement. Fig. 3 is a side view of the lap-ring sections turned and straightened out to the draft position. Fig. 4 is a detail cross-section on line 4 4 of Fig. 3. Fig. 5 is a top plan view of the smaller part A of the lap-ring, and Fig. 6 is an inside face view of one of the arms of the larger part B of the lap-ring.

In the drawings, A and B represent the two parts of the lap-ring. Each of these parts is U-shaped, the part A being smaller than the part B and adapted to be received between the arms of the part B. The arms of the part A are formed on their outer surfaces with longitudinal grooves $a\ a$, which extend from the bent end to points near the free ends of the arms, the grooves being undercut at their ends, as seen in Fig. 1. The arms of the part B are formed on their inner faces with inwardly-projecting lugs $b\ b$, which are of dovetail or undercut form. The part A fits between the arms of part B, so that the lugs $b\ b$ may enter the grooves $a\ a$ by a longitudinal sliding movement when the parts are in the position shown in Fig. 1.

For coupling two eyes or links together the link C of one section of the chain (or the eye of one part which is to be coupled) is hooked into the part A, as seen in dotted lines in Fig. 1, before the two parts of the lap-ring are connected. In like manner the link C' of the other section of the chain (or eye of the other part which is to be coupled) is hooked into the other part B of the lap-ring, as also seen in dotted lines in Fig. 1. The two parts of the lap-ring are now slid toward each other, the small part A passing between the arms of the larger part B and the lugs $b\ b$ of the larger part entering the grooves $a\ a$ of the smaller part, as seen in Fig. 2.

When the lugs $b\ b$ reach the ends of the grooves $a\ a$, the two parts A and B of the lap-ring are turned upon each other into extended alinement, as seen in Fig. 3, and are firmly coupled together and in turn couple the two sections of the chain or the two eyes of any two parts which are required to be connected together.

So long as the draft strain is on the lap-ring it will be seen that the two parts of the same will be held in the position shown in Fig. 3 and cannot come apart. If, however, the parts are to be disconnected, the draft strain is relaxed, the two parts of the lap-ring are turned into the position shown in Fig. 2, and they may then be separated by a longitudinal sliding movement over each other in reverse direction to that which connected them.

Having thus described my invention, what I claim as new, and desire to secure by Letters Patent, is—

1. A lap-ring composed of two U-shaped parts, the longitudinal arms of one part being formed with longitudinal grooves extending from the curved end to near the open end of that part, and the longitudinal arms of the other part being formed with lugs near the open end adapted to enter said grooves, the two parts being locked by a turning movement substantially as described.

2. A lap-ring composed of two U-shaped parts, one part being made smaller than the other part and adapted to be received between the arms of the other part, the smaller part having longitudinal grooves on the outer faces of its arms extending from the curved end to near the open end and the larger part being formed with lugs on the inner faces of its arms near the ends substantially as and for the purpose described.

3. A lap-ring composed of two U-shaped parts, one part being made smaller than the other part and adapted to be received between the arms of the other part, the smaller part having longitudinal undercut grooves on the outer faces of its arms extending from the curved end to near the open end, and the larger part with undercut lugs on the inner faces of the arms near its ends adapted to enter the grooves of the smaller part and be locked thereto by a turning movement as described.

WILBER T. FEILD.

Witnesses:
  WM. MANNING,
  JOHN M. MAHER.